US009967420B2

United States Patent
Zhao et al.

(10) Patent No.: US 9,967,420 B2
(45) Date of Patent: May 8, 2018

(54) THERMAL IMAGING IN A HIGH TEMPERATURE FURNACE

(71) Applicant: Air Products and Chemicals, Inc., Allentown, PA (US)

(72) Inventors: Yan Zhao, Allentown, PA (US); Xianming Jimmy Li, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 271 days.

(21) Appl. No.: 14/963,644

(22) Filed: Dec. 9, 2015

(65) Prior Publication Data
US 2017/0171418 A1    Jun. 15, 2017

(51) Int. Cl.
| | |
|---|---|
| *H04N 1/00* | (2006.01) |
| *H04N 5/225* | (2006.01) |
| *H04N 5/232* | (2006.01) |
| *H04N 5/33* | (2006.01) |

(52) U.S. Cl.
CPC ..... *H04N 1/00989* (2013.01); *H04N 1/00103* (2013.01); *H04N 5/2252* (2013.01); *H04N 5/2254* (2013.01); *H04N 5/23241* (2013.01); *H04N 5/33* (2013.01); *H04N 2005/2255* (2013.01); *H04N 2201/0084* (2013.01)

(58) Field of Classification Search
CPC ............ H04N 5/2252; H04N 5/23241; H04N 1/00103; H04N 5/2254; H04N 2005/2255; H04N 2201/0084; H04N 1/00989; H04N 5/33
See application file for complete search history.

(56) References Cited

U.S. PATENT DOCUMENTS

| | | | |
|---|---|---|---|
| 5,801,825 A * | 9/1998 | Nutter | G02B 23/2492 356/241.1 |
| 6,229,563 B1 * | 5/2001 | Miller, II | F27D 21/02 348/82 |
| 6,798,587 B2 | 9/2004 | Irani | |
| 7,348,562 B2 | 3/2008 | Irani | |
| 7,391,433 B2 | 6/2008 | Pollack | |
| 7,422,559 B2 | 9/2008 | Kehoskie et al. | |
| 8,219,247 B2 | 7/2012 | Esmaili et al. | |
| 8,300,880 B2 | 10/2012 | Esmaili et al. | |

(Continued)

FOREIGN PATENT DOCUMENTS

| | | |
|---|---|---|
| CA | 2358374 A1 | 6/2002 |
| CN | 203478316 U | 3/2014 |
| WO | 0004329 | 1/2000 |

OTHER PUBLICATIONS

Industrial Borescope Operating Manual, GE Inspection Technologies, 2008.

*Primary Examiner* — Zhihan Zhou
(74) *Attorney, Agent, or Firm* — Bryan C. Hoke, Jr.

(57) ABSTRACT

An apparatus and method for thermal imaging of an interior space of a high temperature furnace through an opening in a wall of the furnace. An outer housing houses at least a portion of a rigid borescope. The outer housing has a port for aspirating ambient air through the outer housing to cool the rigid borescope and passing the air through a hole at the end of the outer housing and into the furnace. A camera is operatively connected to a rigid borescope but is located such that it is isolated from the air passing through the outer housing.

19 Claims, 2 Drawing Sheets

(56) References Cited

U.S. PATENT DOCUMENTS

| | | | |
|---|---|---|---|
| 2001/0013892 A1* | 8/2001 | Eversole | H04N 5/2252 348/83 |
| 2005/0281520 A1* | 12/2005 | Kehoskie | G02B 23/2492 385/117 |
| 2010/0141762 A1* | 6/2010 | Siann | H04N 7/185 348/143 |
| 2012/0216568 A1 | 8/2012 | Fisher, Jr. et al. | |
| 2014/0071444 A1 | 3/2014 | Matsumoto | |
| 2015/0077537 A1* | 3/2015 | Thursby | E21B 47/0002 348/85 |
| 2015/0285559 A1* | 10/2015 | Nagai | F23M 11/04 348/83 |

\* cited by examiner

THERMAL IMAGING IN A HIGH TEMPERATURE FURNACE

BACKGROUND

The present disclosure is directed to temperature data acquisition in high temperature furnaces. In particular, the present disclosure is directed to a thermal imaging apparatus and method for acquiring temperature data in a high temperature furnace.

Energy efficiency of high temperature industrial processes is important. For many processes, such as hydrogen production, the efficiency of the process is related to the ability to monitor/maintain certain temperatures in the furnace. Measuring temperatures in areas with complex geometric features can present particular challenges. For example, when measuring temperatures at specific locations of the geometric features, inconsistency in taking the measurements at the specific location on the feature can result in inconsistent measurements. More precise monitoring of the temperature at the specific location on the feature can permit improved energy efficiency by permitting more accurate data to be used for process control.

Industry desires to acquire thermal images for improved furnace operation and improved energy efficiency.

In the prior art, thermal imaging devices are disclosed where digital images are obtained by pointing a digital camera through a viewport and "taking a picture" of the inside of the high temperature furnace. The camera is exposed only briefly to the heat radiation from the furnace thus avoiding damage to the camera.

Industry desires a thermal imaging device that can be used to acquire thermal images over an extended period of time without removing the thermal imaging device.

Industry desires a thermal imaging device that is adaptable and can be placed at various locations on the furnace.

Industry desires a thermal imaging device that is portable and self-contained.

Also in the prior art are thermal imaging devices that are actively cooled either using water or compressed air. A water-cooled system has the disadvantage of requiring a water source to be connected to the thermal imaging system. A compressed air-cooled system has the disadvantage of requiring a compressed air source connected to the thermal imaging system.

Industry desires a thermal imaging device that does not require active cooling, such as provided by compressed cooling air or cooling water.

Industry desires a thermal imaging device that is robust and can withstand changes in furnace operation including furnace pressure changes.

Some prior art thermal imaging systems also have the disadvantage of requiring additional holes to be made in the furnace.

Industry desires a thermal imaging apparatus capable of being mounted to a high temperature furnace without the need to make additional holes in the furnace.

Industry desires a thermal imaging device that can be installed with minimal modifications to the high temperature furnace.

BRIEF SUMMARY

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. An apparatus for thermal imaging of an interior space (100) of a high temperature furnace through an opening in a wall (110) of the furnace, the apparatus comprising:

a camera (10) comprising an optical sensor;

a rigid borescope (20) comprising an elongated housing having a viewing end (22) and a sensor end (24), and a multi-element relay lens assembly within the elongated housing having at least two optical pieces for directing a real image viewed by the rigid borescope (20) to the camera (10), the viewing end (22) comprising a lens, the sensor end (24) of the rigid borescope (20) operatively connected to the camera (10);

an outer housing (30) having a sensor end portion (34) and a viewing end portion (32) and defining an interior space within the outer housing (30), the interior space containing at least a portion of the rigid borescope (20), the outer housing (30) and the at least a portion of the rigid borescope (20) defining a passage (35) therebetween, the sensor end portion (34) of the outer housing (30) corresponding to the sensor end (24) of the rigid borescope (20), the viewing end portion (32) of the outer housing (30) corresponding to the viewing end (22) of the borescope (20), the viewing end portion (32) defining a hole (25) in fluid communication with the passage (35), the hole (25) cooperatively arranged to permit the real image to pass to the viewing end (22) of the rigid borescope (20), the outer housing (30) having a port (40) operatively disposed between the sensor end portion (34) and the viewing end portion (32), the port (40) in fluid communication with the passage (35), wherein the camera (10) is operatively disposed outside the passage (35) and outside the port (40); and a partitioning member (50) operatively disposed to obstruct fluid communication between the passage (35) and the camera (10).

Aspect 2. The apparatus of aspect 1 wherein the lens is made of a material selected from the group consisting of sapphire, quartz, and calcium fluoride.

Aspect 3. The apparatus of aspect 1 or aspect 2 wherein the elongated housing of the rigid borescope (20) has an external surface, wherein the external surface has an enhanced heat transfer surface geometry.

Aspect 4. The apparatus of any one of aspects 1 to 3 wherein the lens is operatively disposed within the interior space of the outer housing (30).

Aspect 5. The apparatus of any one of aspects 1 to 4 wherein the partitioning member (50) is disposed inside the outer housing (30).

Aspect 6. The apparatus of aspect 5 wherein the partitioning member (50) forms a flow barrier between an inner wall portion of the outer housing (30) and an outer wall portion of the elongated housing of the rigid borescope (20).

Aspect 7. The apparatus of any one of aspects 1 to 6 further comprising a container (90) operatively connected to the sensor end portion (34) of the outer housing (30), wherein the container (90) contains the camera (10).

Aspect 8. The apparatus of aspect 7 further comprising a battery (60) operatively connected to the camera to provide power to the camera (10), wherein the container (90) contains the battery (60).

Aspect 9. The apparatus of aspect 8 further comprising a solar panel (65) operatively connected to the battery (60), the solar panel disposed outside the container (90).

Aspect 10. The apparatus of any one of aspects 7 to 9 further comprising a controller (75) operatively connected to the camera (10), wherein the container 90 contains the controller (75).

Aspect 11. The apparatus of any one of aspects 7 to 10 further comprising a wireless transmitter (70) operatively connected to the camera (10) to transmit images from the camera (10) to a computer, wherein the container (90) contains the wireless transmitter (70).

Aspect 12. The apparatus of any one of aspects 7 to 11 further comprising memory storage operatively connected to the camera to store images taken by the camera, wherein the memory storage is contained in the container (90).

Aspect 13. The apparatus of any one of aspects 7 to 12 wherein the partitioning member (50) is disposed inside the container (90).

Aspect 14. The apparatus of any one of aspects 7 to 13 wherein the container (90) is a weatherproof container (90).

Aspect 15. The apparatus of any one of aspects 7 to 14 further comprising a connector (98), the connector (98) connecting the container (90) to the outer housing (30).

Aspect 16. The apparatus of the aspect 15 wherein the partitioning member (50) is disposed in the connector (98).

Aspect 17. The apparatus of any one of the preceding aspects further comprising a wavelength filter operatively disposed between the optical sensor and the viewing end (22) of the rigid borescope (20).

Aspect 18. The apparatus of any one of the preceding aspects wherein the partitioning member (50) comprises a seal, the seal providing a fluid tight separation between the passage (35) and the camera (10).

Aspect 19. The apparatus of any one of aspects 1 to 17 wherein the partitioning member (50) comprises a check valve.

Aspect 20. The apparatus of any one of the preceding aspects wherein the elongated housing of the rigid borescope (20) is tapered at the viewing end (22) and terminates at the lens.

Aspect 21. The apparatus of any one of the preceding aspects wherein the hole (25) provides fluid communication between the passage (35) and the interior space (100) of the high temperature furnace.

Aspect 22. The apparatus of any one of the preceding aspects wherein the port (40) provides fluid communication between the environment external the outer housing (30) and the passage (35).

Aspect 23. The apparatus of any one of the preceding aspects further comprising a refractory block (80), the refractory block (80) defining a cavity therethrough, wherein at least a portion of the viewing end portion (32) of the outer housing (30) is disposed within the cavity of the refractory block (80), the refractory block (80) cooperatively arranged to permit the real image to pass to the viewing end (22) of the rigid borescope (20).

Aspect 24. The apparatus of aspect 23 wherein the opening in the wall of the furnace also serves as a viewport, the apparatus further comprising a viewport door plate (82), wherein the outer housing (30) is attached to the viewport door plate (82), wherein the outer housing (30) passes through the viewport door plate (82), wherein the viewport door plate (82) is disposed between the port (40) and the viewing end portion (32) of the outer housing (30), and wherein the refractory block (80) is attached to the viewport door plate (82).

Aspect 25. The apparatus of aspect 24 further comprising a hinge (84) attached to the viewport door plate (82) and an external wall (86) of the high temperature furnace (to permit the viewing end portion (32) of the outer housing (30) to be removed from the opening in the wall of the furnace by opening the viewport door plate).

Aspect 26. The apparatus of aspect 24 or aspect 25 wherein the outer housing (30) is attached to the viewport door plate (82) with a swivel connector (that permits the outer housing (30) and correspondingly the borescope to move relative to the viewport door plate).

Aspect 27. The apparatus of aspect 24 wherein the camera (10) and the rigid borescope (20) are removable from the outer housing (30) as a subassembly;
  wherein the subassembly is installable in a second outer housing (130), the second outer housing (130) having a sensor end portion (134) and a viewing end portion (132) and defining an interior space within the second outer housing (130),
  wherein when the subassembly is installed in the second outer housing (130), the interior space of the second outer housing (130) contains at least a portion of the rigid borescope (20), the second outer housing (130) and the at least a portion of the rigid borescope (20) define a passage (135) therebetween, the sensor end portion (134) of the second outer housing (130) corresponds to the sensor end (24) of the rigid borescope (20), the viewing end portion (132) of the second outer housing (130) corresponds to the viewing end (22) of the borescope (20), the viewing end portion (132) of the second outer housing (130) defines a hole (125) in fluid communication with the passage (135) in the second outer housing (130) wherein the hole (125) is cooperatively arranged to permit the real image to pass to the viewing end (22) of the borescope (20), the second outer housing (130) has a port (140) operatively disposed between the sensor end portion (134) and the viewing end portion (132) of the second outer housing (130) wherein the port (140) of the second outer housing (130) is in fluid communication with the passage (135) in the second outer housing (130), and the camera (10) is operatively disposed outside the passage (135) of the second outer housing (130) and outside the port (140) of the second outer housing (130); and
  wherein the second outer housing (130) is attached to a second viewport door plate (182), wherein the second outer housing (130) passes through the second viewport door plate (182), wherein the second viewport door plate (182) is disposed between the port (140) of the second outer housing (130) and the viewing end portion (132) of the second outer housing (130), and wherein a second refractory block (180) is attached to the second viewport door plate (182), wherein the second refractory block (180) defines a cavity therethrough, wherein at least a portion of the viewing end portion (132) of the second outer housing (130) is disposed within the cavity of the second refractory block (180) wherein the second refractory block (180) is cooperatively arranged to permit the real image to pass to the viewing end (22) of the rigid borescope (20).

Aspect 28. The apparatus of aspect 27 wherein the subassembly further comprises the container (90) of aspect 6.

Aspect 29. The apparatus of aspect 27 or aspect 28 wherein the subassembly further comprises the battery (60) of aspect 7.

Aspect 30. The apparatus of any one of aspects 27 to 29 wherein the subassembly further comprises the solar panel (65) of aspect 8.

Aspect 31. The apparatus of any one of aspects 27 to 30 wherein the subassembly further comprises the wireless transmitter (70) of aspect 9.

Aspect 32. The apparatus of any one of aspects 27 to 31 wherein the subassembly further comprises the memory storage of aspect 10.

Aspect 33. The apparatus of any one of the preceding aspects further comprising a flow regulator (45) operatively disposed to regulate flow of a fluid through the port (40) of the outer housing (30).

Aspect 34. The apparatus of aspect 33 further comprising
    a temperature sensor configured to acquire a measured value relatable to a temperature of the viewing end (22) of the rigid borescope (20) and for generating an electronic signal in response thereto; and at least one of
      (i) a meter with display operatively connected to the temperature sensor to receive the electronic signal and display a temperature value responsive to the electronic signal; and
      (ii) an electronic controller operatively connected to the temperature sensor and the flow regulator (45) and configured to control the flow regulator (45) to regulate the flow of the fluid through the port (40) in response to the electronic signal from the temperature sensor.

Aspect 35. The apparatus of any one of the preceding aspects wherein the passage (35) has a cross-sectional flow area and the hole (25) has a cross-sectional flow area, wherein the cross-sectional flow area of the hole (25) is less than the cross-sectional flow area of the passage (35) to improve cooling of the viewing end portion (32) of the outer housing (30) by increasing a flow speed of a fluid flowing from the port (40) towards and through the hole (25).

Aspect 36. A method for obtaining thermal images in a high temperature furnace over an extended period of time, the method comprising:
    installing an assembly for thermal imaging on the high temperature furnace, the assembly for thermal imaging comprising
      a camera (10) comprising an optical sensor;
      a rigid borescope (20) comprising an elongated housing having a viewing end (22) and an sensor end (24), and a multi-element relay lens assembly within the elongated housing having at least two optical pieces for directing a real image viewed by the rigid borescope (20) to the camera, the viewing end (22) comprising a lens, the sensor end (24) of the borescope operatively connected to the camera;
      an outer housing (30) having a sensor end portion and a viewing end portion (32) and defining an interior space within the outer housing (30), the interior space containing at least a portion of the rigid borescope (20), the outer housing (30) and the at least a portion of the rigid borescope (20) defining a passage (35) therebetween, the sensor end portion of the outer housing (30) corresponding to the sensor end (24) of the rigid borescope (20), the viewing end portion (32) of the outer housing (30) corresponding to the viewing end (22) of the rigid borescope (20), the viewing end portion (32) defining a hole in fluid communication with the passage, the hole cooperatively arranged to permit the real image to pass to the viewing end (22) of the borescope, the outer housing (30) having a port (40) operatively disposed between the sensor end portion and the viewing end portion (32), the port (40) in fluid communication with the passage (35), wherein the camera (10) is operatively disposed outside the passage (35) and outside the port (40);
    aspirating (ambient) air from outside the outer housing (30) into the port (40) in the outer housing (30), passing the air from the port through the passage and over an external surface of the elongated housing of the rigid borescope (20), passing the air from the passage over the lens and out the hole in the viewing end portion (32) of the outer housing (30) and into the high temperature furnace wherein the air does not pass over the camera when being passed from the port to the high temperature furnace; and
    measuring temperature information by:
      directing a plurality of real images viewed by the rigid borescope (20) to the camera;
      capturing a plurality of images corresponding to the plurality of real images wherein each image of the plurality of images comprises pixel data; and
      processing the pixel data to obtain the temperature information for each of the plurality of images.

Aspect 37. The method of aspect 36 wherein the lens is made of a material selected from the group consisting of sapphire, quartz, and calcium fluoride.

Aspect 38. The method of aspect 36 or aspect 37 further comprising:
    providing electrical power to the camera (10) with a battery (60).

Aspect 39. The method of aspect 37 further comprising:
    providing electrical power to the battery (60) with a solar panel (65).

Aspect 40. The method of any one of aspects 36 to 39 further comprising:
    wirelessly transmitting the pixel data to a computer.

Aspect 41. The method of any one of aspects 36 to 40 further comprising:
    acquiring a measured value relatable to a temperature of the viewing end (22) of the rigid borescope (20); and
    adjusting a flow rate of air through the passage responsive to the measured value relatable to the temperature of the viewing end (22) of the rigid borescope (20).

Aspect 42. The method of any one of aspects 36 to 41 wherein ambient air is aspirated into the port (40), wherein the ambient air is air in an unenclosed space proximate to and outside the furnace and proximate to and outside the outer housing (30), the ambient air having a pressure; and
    wherein the furnace is operated, at least in the vicinity of the viewing end portion (32) of the outer housing (30), at a pressure that is less than the pressure of the ambient air outside the furnace and the outer housing (30).

DETAILED DESCRIPTION OF THE PREFERRED EMBODIMENTS

Figure 1:
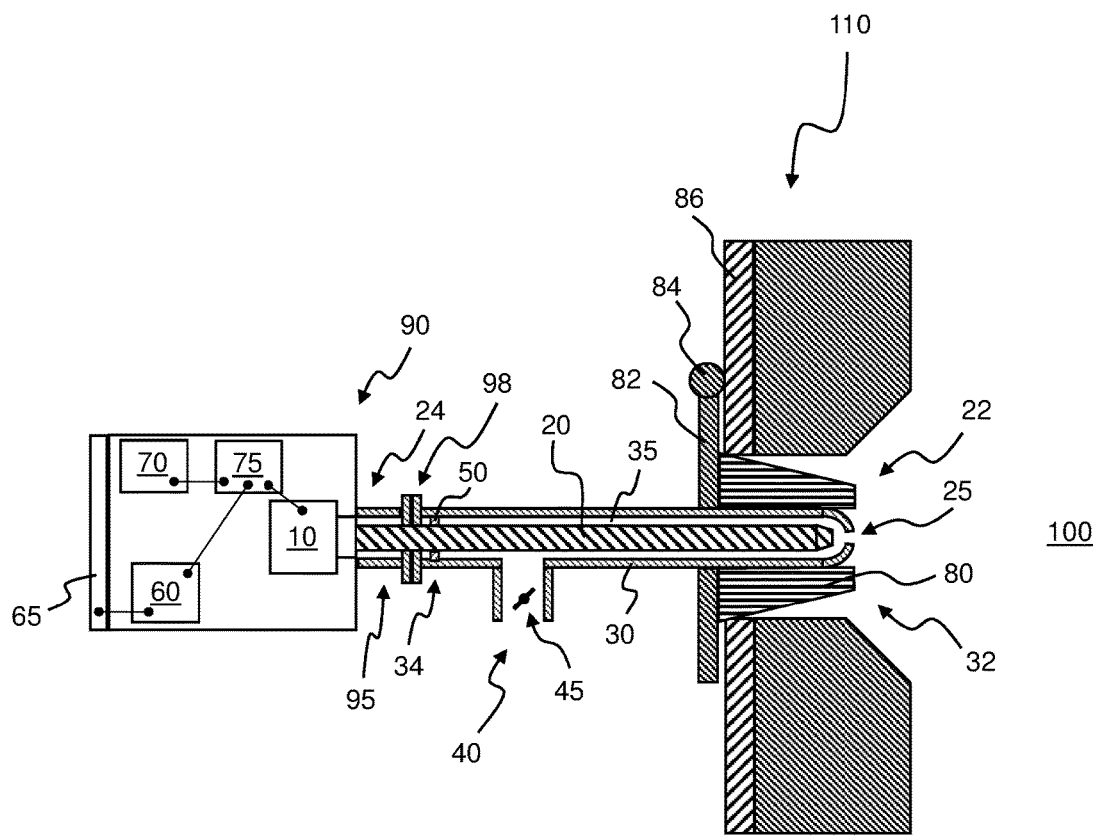
FIG. 1 is a schematic of an apparatus for thermal imaging of an interior space of a high temperature furnace through an opening in the wall of the furnace.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The term "plurality" means "two or more than two."

The phrase "at least a portion" means "a portion or all."

The present invention is described with reference to the drawings, where like reference numbers refer to like elements throughout the figures.

The present invention relates to an apparatus for thermal imaging of an interior space 100 of a high temperature furnace where the thermal image is acquired through an opening in a wall 110 of the furnace, for example through a viewport.

The apparatus comprises a camera 10 comprising an optical sensor. Any camera suitable for acquiring thermal images can be used. The camera may be consumer grade or industrial/scientific grade. Suitable consumer grade cameras include, for example, Nikon F mount cameras, and Sony E mount cameras, with a conversion adapter for a corresponding borescope mount type. Suitable industrial/scientific grade cameras include, for example, Andor Technology, Basler, JAI, etc. If a consumer grade camera is used, the RAW format output may be used to relate the signal count with radiation intensity measured. RAW format image provides high dynamic range for wider temperature measurement range, and more reliable correlation between signal count and target temperature.

The apparatus may include one or a combination of wavelength filters operatively disposed between the optical sensor of the camera and the viewing end of the rigid borescope. The one or more filters may be placed anywhere in the optical path, for example, within the borescope. For thermal imaging of surfaces like reformer tubes and refractories, common pyrometry wavelengths may be a narrow band near 0.9 µm, 1.6 µm and 3.9 µm. Combined with camera optical sensor chip spectral response, either long pass optical filters or band pass optical filters could be selected to achieve above-mentioned wavelength ranges. The wavelength filters are used to avoid the absorption and emission bands of the gas species in the furnace, hence the signal could be related to surface temperature with little or no correction.

The apparatus comprises a rigid borescope 20. The rigid borescope 20 comprises an elongated housing having a viewing end 22 and a sensor end 24. The rigid borescope 20 comprises a multi-element relay lens assembly within the elongated housing having at least two optical pieces for directing a real image viewed by the rigid borescope 20 to the camera 10.

The viewing end 22 of the rigid borescope 20 comprises a lens. The lens at the viewing end 22 of the rigid borescope 20 may be constructed from any lens material suitable for high-temperature operation, for example, a material selected from the group consisting of sapphire, quartz, and calcium fluoride. The sensor end 24 of the rigid borescope 20 is operatively connected to the camera 10.

The length of the rigid borescope 20 may be greater than about 0.3 m so that the camera and other electronics can be located a desired distance away from the high temperature furnace. The maximum length of the rigid borescope 20 may be any practical and/or desirable length, for example, 1 m.

The elongated housing of the rigid borescope 20 may be tapered at the viewing end 22. An elongated housing that is tapered at the viewing end 22 helps to reduce radiant heat transfer from the high temperature furnace to the viewing end 22 of the elongated housing.

Borescopes are known in the art. Any suitable borescope can be used, for example, V-PL OL series of high temperature lenses from Marshall Electronics. Such a borescope is able to continuously withstand a temperature of 370° C. at the lens and 200° C. throughout the body of the borescope.

The apparatus comprises an outer housing 30 defining an interior space therein. The interior space contains at least a portion of the rigid borescope 20. The outer housing 30 and the at least a portion of the rigid borescope 20 define a passage 35 between the outer housing 30 and the at least a portion of the rigid borescope 20. The outer housing 30 has a sensor end portion 34 and a viewing end portion 32. The sensor end portion 34 corresponds to the sensor end 24 of the rigid borescope 20 and the viewing end portion 32 corresponds to the viewing end 22 of the rigid borescope 20.

The viewing end portion 32 of the outer housing 30 defines a hole 25 in fluid communication with the passage 35. The hole 25 is cooperatively arranged to permit the real image to pass to the viewing end 22 of the borescope 20. The lens of the rigid borescope is operatively disposed within the interior space of the outer housing 30, i.e. it is recessed from the hole 25. The viewing end 22 of the rigid borescope 20 with the lens is recessed from the hole 25 in the outer housing 30 to reduce radiant heat transfer to the end of the rigid borescope 20. In operation, the hole 25 provides fluid communication between the passage 35 and the interior space 100 of the high temperature furnace.

The hole 25 is sized to limit heating of the borescope lens due to radiation from the furnace while enhancing cooling from aspirated air (discussed below). The cross-sectional flow area for the passages 35 may be desirably greater than the cross-sectional flow area of the hole 25 to improve cooling of the of the viewing end portion 32 of the outer housing 30 resulting from an increasing the velocity of the air flowing through the hole 25.

The outer housing 30 has a port 40 operatively disposed between the sensor end portion 34 of the outer housing 30 and the viewing end portion 32 of the outer housing 30. The port 40 is in fluid communication with the passage 35. The port 40 provides fluid communication between the environment external the outer housing 30 and the passage 35.

The apparatus is intended for use on furnaces that operate at negative pressure, such as steam-hydrocarbon reforming furnaces.

The port 40 is designed to permit the aspiration of ambient air from outside the outer housing 30 into the port 40, through the passage 35, and through the hole 25 into the interior space 100 of the furnace. The aspiration of ambient air through the passage 35 acts to cool the rigid borescope 20. The ambient air aspirated through the passage 35 also acts to cool the lens at the viewing end of the borescope and cool the viewing end portion 32 of the outer housing 30. To help with cooling, the rigid borescope 20, the external surface of the elongated housing of the rigid borescope 20 may have an enhanced heat transfer surface geometry. The external surface may have a geometry to effect a swirl flow in the passage 35.

Using aspirated air provides the benefit that no external cooling lines for compressed air or cooling water are required.

The flow of aspirated air through the port 40 may be regulated with a flow regulator 45. The flow regulator 45 may be any adjustable flow restriction that would permit regulation of the flow of aspirated air through the port 40. The flow regulator 45 may be located in the port 40 as shown or in the passage 35 (not shown).

The apparatus may comprise a temperature sensor (not shown), for example a thermocouple, configured to acquire a measured value relatable to a temperature of the viewing end 22 of the rigid borescope 20 and for generating an electronic signal in response thereto, and a meter (not shown) with display operatively connected to the temperature sensor to receive the electronic signal and display a temperature value responsive to the electronic signal. The temperature sensor probe may be fixed in the outer housing 30 at the viewing end portion 32 with a wire terminating in a connector towards the sensor end portion 34 of the outer housing 30. The connector may be outside the housing for suitable connection with the meter. The meter may be portable.

Using the temperature sensor and the meter, the flow of aspirated air through the port 40 can be adjusted to provide the desired amount of cooling while minimizing excess flow of aspirated air. Aspirated air into the high temperature furnace will decrease the furnace efficiency, so providing a sufficient flow of aspirated air to cool the borescope and lens without excess flow is desirable.

In embodiments in which the apparatus comprises the flow regulator 45 located in the passage 35 (not shown) or in the port 40 and the temperature sensor, the apparatus may further comprise an electronic controller, the controller operatively connected to the temperature sensor and the flow regulator 45 to control the flow rate of aspirated air through the port 40 by means of the flow regulator 45 and in response to the electronic signal received from the temperature sensor. Should the temperature of the viewing end 22 determined by means of the temperature sensor be above a predetermined maximum threshold value, the controller may control the flow regulator 45 to allow the flow rate of aspirated air through the passage 35 to increase. Should the temperature of the viewing end 22 determined by means of the temperature sensor be below a predetermined minimum threshold value, the controller may control the flow regulator to allow the flow rate of aspirated air through the passage 35 to decrease.

The camera 10 is operatively disposed outside of the passage 35 and outside the port 40. The port 40 in the outer housing 30, the passage 35, and the hole 25 in the viewing end 22 of the outer housing 30 are arranged relative to the camera 10 so that fluid passing through the port 40 to the hole 25 into the interior space 100 of the furnace does not pass over the camera 10. The camera 10 is isolated from the bulk flow of aspirated air passing through the port 40 to the interior space 100 of the furnace. Locating the camera 10 in a location where the aspirated ambient air from the port 40 to the interior space 100 of the furnace does not pass over the camera 10 has a particular advantage. As stated above, the apparatus is intended to be used on a high temperature furnace operating at negative pressure. While the high temperature furnace may be designed to operate at negative pressure, it can happen that the furnace pressure might inadvertently go positive. In such a case, furnace gases from the interior space 100 of the high temperature furnace will pass through the hole 25, into the passage 35 and out the port 40, i.e. a reverse flow condition. The rigid borescope 20 can tolerate short durations at high temperature. The same cannot be said for the camera 10. In case the camera 10 were located in the passage 35 or port 40, the high temperature furnace gases would likely damage the camera 10.

The apparatus comprises a partitioning member 50 which is operatively disposed to obstruct fluid communication between the passage 35 and the camera 10 to isolate the camera 10 from the passage 35, particularly during a reverse flow condition in the passage 35. The partitioning member 50 blocks flow from the passage 35 to the camera.

The partitioning member 50 may be disposed inside the outer housing 30 as shown in FIG. 1. The partitioning member 50 may be integral with the outer housing 30 or a separate piece like a bushing. The partitioning member may comprise a seal where the seal mates with the elongated housing of the rigid borescope 20 and provides a fluid tight separation between the passage 35 and the camera 10.

The apparatus may comprise a container 90 operatively connected to the sensor end portion 34 of the outer housing 30. The container 90 may contain the camera 10 and other electronics, described below. The container 90 may be a weatherproof container. The container 90 may have a fitting member 95 for connecting the container to the outer housing 30. The fitting member 95 and the sensor end portion 34 of the outer housing 30 may each terminate in a flange.

The partitioning member 50 may be disposed inside the container 90. The partitioning member 50 may be disposed in the fitting member 95 of the container 90.

The apparatus may comprise a connector 98 for connecting the container 90 to the sensor end 34 of the outer housing 30. The connector 98 may be any known quick disconnect coupling. The partitioning member 50 may be disposed in the connector 98.

The partitioning member 50 may comprise a check valve (not shown). A check valve is also known as a clack valve, non-return valve, and one-way valve. The check valve allows gas to flow only in one direction. Any suitable check valve may be used. The check valve may be configured to allow a purge flow of air to pass over the camera and other electronics in the container 90 and into the passage 35 during normal flow conditions when the furnace is operating under negative pressure. A purge flow of air may be desired to prevent combustible gases from accumulating in the container 90. In case of reverse flow due to positive furnace pressure, all of the furnace gases are directed through the port 40 since the check valve prevents the furnace gases from contacting the camera 10 and other electronics.

The apparatus may comprise a battery 60 operatively connected to the camera 10 to provide power to the camera 10. The battery 60 may be integral with the camera 10. The battery 60 may be separate from the camera 10. The battery may be contained within the container 90.

The apparatus may comprise a solar panel 65 operatively connected to the battery 60. The solar panel 65 may be disposed outside the container 90 to receive light energy which is converted to electricity. The solar panel 65 may be used to charge the battery 60.

Alternatively or in addition to the solar panel 65, a thermoelectric power generator could be used since heat energy from the high temperature furnace is readily available.

The apparatus may comprise a wireless transmitter 70 operatively connected to the camera 10 to transmit images from the camera 10 to a computer (not shown). The wireless transmitter 70 may be contained in container 90. The wireless transmitter 70 may transmit using any known wireless transmitting protocol, for example Blue-Tooth, Wi-Fi, cellular network, or the like. The wireless transmitter 70 may be powered by the battery 60. Using a wireless transmitter 70 in combination with the battery provides the benefit that no external wiring is required.

The apparatus may comprise a controller 75. The controller 75 may be a computer. The controller may be a tablet-type computer such as an iPad®, Microsoft Surface Pro™, or the like. The controller 75 may be contained in container 90.

The apparatus may comprise memory storage operatively connected to the camera to store images taken by the camera. The memory storage may be integral with the camera. The memory storage may be integral with the controller 75. The memory storage may be contained in the container 90. The memory storage can be an SD card, USB drive, or any known memory storage known in the art.

The data from the acquired images may be stored locally at the thermal imaging system using the memory storage for operators to retrieve when desired. Alternately or in addition, data may be wirelessly transferred to a receiver away from the viewport for review by an operator.

The electronics components of the system may be chosen to limit the power consumption of the system. In general, the entire electronic system may be designed to achieve low power consumption e.g. several Watts in operating mode, and about 1 W at standby or sleep mode) so that the battery and local power generation is sufficient to power the thermal imaging system. Desirably, the solar panel and/or thermoelectrics and battery can provide power for the system without the need for charging by an external source. The camera 10 and controller 75 may be configured to "wake up" intermittently to acquire images and process data.

The electronics components of the system may be selected to be Class I Division 2 compatible. This may be accomplished, for example, by using hermetically sealed or explosion proof enclosure or meeting PEP-1 or PEP-2 requirements of ISA-RP12.12.03.

The apparatus may further comprise a refractory block 80 wherein the refractory block defines a cavity therethrough. At least a portion of the viewing end portion 32 of the outer housing 30 may be disposed within the cavity of the refractory block 80. The refractory block 80 is cooperatively arranged to permit the real image to pass to the viewing end 22 of the rigid borescope 20. The refractory block 80 may be constructed of any suitable refractory material, for example, alumina, silica, and magnesia. The refractory block 80 may be attached to the outer housing 30.

The opening in the wall 110 of the furnace may also serve as a viewport. The apparatus may further comprise a viewport door plate 82. The outer housing 30 may be attached, for example welded, to the viewport door plate 82, wherein the outer housing 30 passes through the viewport door plate 82. The viewport door plate 82 may be disposed between the port 40 and the viewing end portion 32 of the outer housing 30. The outer housing 30 may be attached to the viewport door plate 82 with a swivel connector. A swivel connector would permit the outer housing 30 and correspondingly the rigid borescope 20 to move relative to the viewport door plate 82. Using a swivel connector would permit the rigid borescope 20 to view different areas in the furnace. The refractory block 80 may be attached to the viewport door plate 82.

As an alternative to the swivel connector for viewing different parts in a furnace, the apparatus may comprise a second camera (not shown) comprising an optical sensor, and second rigid borescope (not shown). The second rigid borescope may comprise an elongated housing having a viewing end and a sensor end, and a multi-element relay lens assembly within the elongated housing having at least two optical pieces for directing a real image viewed by the second rigid borescope to the second camera. The viewing end of the rigid borescope, if present, comprises a lens. The sensor end of the second rigid borescope, if present, is operatively connected to the second camera, if present. The interior space of the outer housing 30 may contain at least a portion of the second rigid borescope. The viewing end portion 32 of the outer housing 30 may define a second hole (not shown) in fluid communication with the passage 35, the second hole cooperatively arranged to permit a second real image to pass to the viewing end of the second rigid borescope. The second camera may be disposed in the container 90.

The apparatus may comprise a hinge 84 attached to the viewport door plate 82 and an external wall 86 of the high temperature furnace. The hinge permits easy removal of the viewing end portion 32 of the outer housing 30 from the opening in the wall 110 of the furnace by opening the viewport door plate 82.

Figure 2:
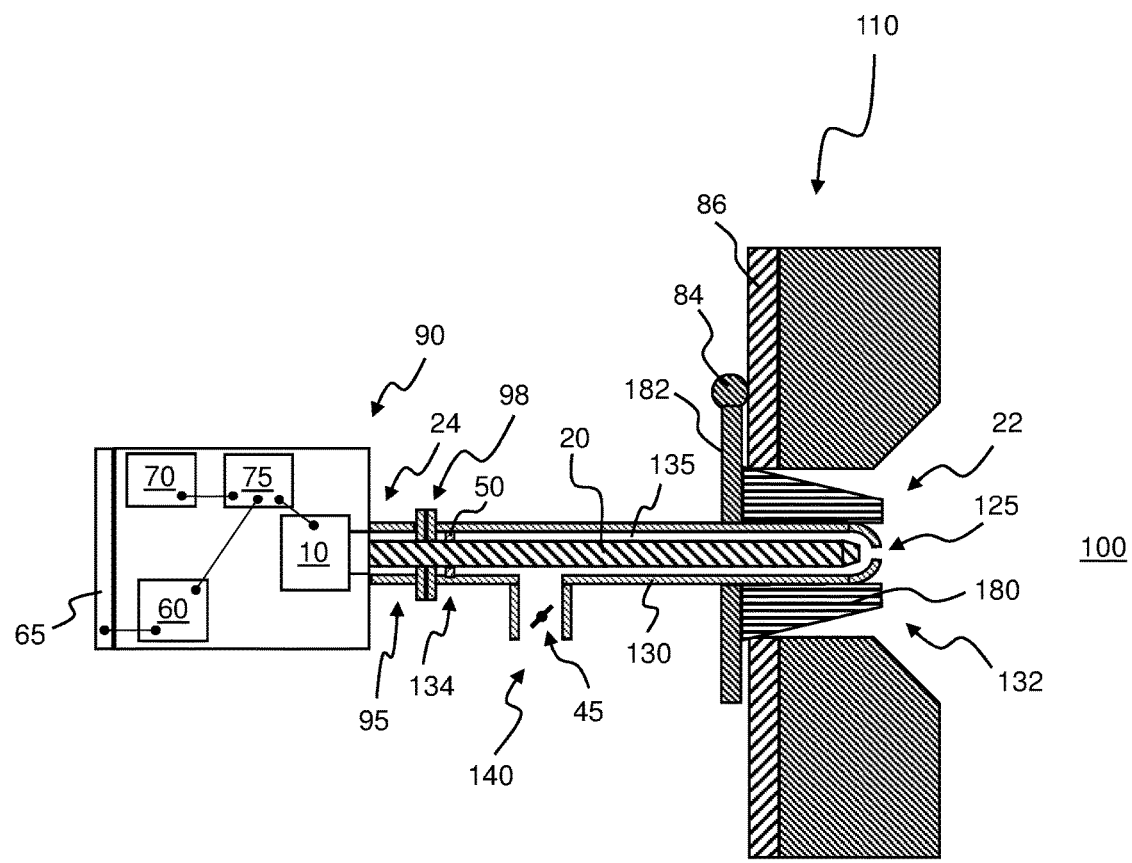
FIG. 2 is a schematic of an apparatus for thermal imaging of an interior space of a high temperature furnace through a second opening in the wall of the furnace where a subassembly of the apparatus has been redeployed to the second opening.

The camera 10 and the rigid borescope 20 may be removable jointly from the outer housing 30 as a subassembly. The subassembly may comprise one or more of the container 90, the battery 60, the solar panel 65, the wireless transmitter 70, and the memory storage. This offers the benefit that the subassembly may be easily redeployed at a different viewport that is suitably configured as shown in FIG. 2.

The subassembly may be installable in a second outer housing 130, the second outer housing 130 having a sensor end portion 134 and a viewing end portion 132 and defining an interior space within the second outer housing 130.

When a subassembly is removed from any outer housing (30, 130), the sensor end portion (34, 134) of the outer housing may be capped.

When the subassembly is installed in the second outer housing 130, the interior space of the second outer housing 130 contains at least a portion of the rigid borescope 20. The second outer housing 130 and the at least a portion of the rigid borescope 20 define a passage 135 therebetween. The sensor end portion 134 of the second outer housing 130 corresponds to the sensor end 24 of the rigid borescope 20. The viewing end portion 132 of the second outer housing 130 corresponds to the viewing end 22 of the borescope 20. The viewing end portion 132 of the second outer housing 130 defines a hole 125 in fluid communication with the passage 135 in the second outer housing 130.

The hole 125 is cooperatively arranged to permit the real image to pass to the viewing end 22 of the borescope 20. The second outer housing 130 has a port 140 operatively disposed between the sensor end portion 134 and the viewing end portion 132 of the second outer housing 130. The port 140 of the second outer housing 130 is in fluid communication with the passage 135 in the second outer housing 130. The camera 10 is operatively disposed outside the passage 135 of the second outer housing 130 and outside the port 140 of the second outer housing 130.

The second outer housing 130 may be attached to a second viewport door plate 182, wherein the second outer housing 130 passes through the second viewport door plate 182. The second viewport door plate 182 may be disposed between the port 140 of the second outer housing 130 and the viewing end portion 132 of the second outer housing 130. A second refractory block 180 may be attached to the second viewport door plate 182, wherein the second refractory block 180 defines a cavity therethrough. At least a portion of the viewing end portion 132 of the second outer housing 130 may be disposed within the cavity of the second refractory block 180 wherein the second refractory block 180 is cooperatively arranged to permit the real image to pass to the viewing end 22 of the rigid borescope 20.

The present invention also relates to a method for obtaining thermal images in a high temperature furnace where the measurements are obtained over an extended period of time.

The method comprises installing the apparatus as described above, with or without any optional features, on the high temperature furnace.

The method comprises aspirating (ambient) air from outside the outer housing 30 into the port 40 in the outer housing 30, passing the air from the port 40 through the passage 35 and over an external surface of the elongated housing of the rigid borescope 20, passing the air from the passage 35 over the lens and out the hole 25 in the viewing end portion 32 of the outer housing 30 and into the high temperature furnace. Due to the construction of the apparatus, the air does not pass over the camera 10 when being passed from the port 40 into the interior space 100 to the high temperature furnace.

Ambient air is air in an unenclosed space proximate to and outside the furnace and proximate to and outside the outer housing 30. The term "unenclosed space" denotes a space that is open to or in flow communication with the outer environment at the site where the furnace is installed. This outer environment may, in particular constitute the unenclosed space. The ambient air has a pressure. The furnace is operated, at least in the vicinity of the viewing end portion 32 of the outer housing 30, at a negative pressure, I,e. at a pressure that is less than the pressure of the ambient air outside the furnace and the outer housing 30.

The method comprises measuring temperature information by directing a plurality of real images viewed by the rigid borescope 20 to the camera 10, capturing a plurality of images corresponding to the plurality of real images wherein each image of the plurality of images comprises pixel data, and processing the pixel data to obtain the temperature information for each of the plurality of images.

The method may further comprise providing electrical power to the camera 10 with a battery 60.

The method may further comprise providing electrical power to the battery 60 with a solar panel 65.

The method may further comprise wirelessly transmitting the pixel data to a computer.

The method may further comprise introducing a purge flow of air into the container 90, passing the purge flow of air through a check valve in the partitioning member 50 and into the passage 35, and from the passage 35 through the hole 25 and into the interior space 100 of the furnace.

The method may further comprise acquiring a measured value relatable to a temperature of the viewing end 22 of the rigid borescope 20, and adjusting a flow rate of air through the passage responsive to the measured value relatable to the temperature of the viewing end 22 of the rigid borescope 20.

EXAMPLE

A thermal imaging assembly according to the present invention was constructed and deployed to acquire thermal images in a steam-hydrocarbon reforming furnace containing a plurality of catalyst-containing reformer tubes to monitor the temperature of the tubes over an extended period of time.

The rigid borescope was a Marshall Electronics V-PL-HITEMP-452. The camera was a consumer grade Nikon D600 camera which was modified by removing the internal IR blocking filter on top of the optical sensor chip. The borescope and camera were coupled using an adapter made by Marshall Electronics which connects the CS mount on the borescope to the F mount on the Nikon camera. A 780 nm long pass filter was added to block the visible end of radiation.

The passage between the housing of the borescope and the outer housing had a cross-sectional area of about 15 $cm^2$. The hole at the end of the outer housing had an area of about 20 $cm^2$. The port in the outer housing had a cross-sectional area of about 3 $cm^2$.

The furnace operated under negative pressure conditions of about −1 inches of water (101.076 kPa).

Ambient air was aspirated through the port, through the outer housing and into the reformer furnace. With the passive ambient air cooling design, the temperature of the lens at the end of the borescope was measured to be about 149° C. under normal operating conditions.

An external battery pack was used to permit hundreds of images to be acquired over a period of several months. Images were acquired using a timed interval shooting mode where images were taken at intervals ranging from 1 hours to 6 hours.

RAW images were saved to an SD card.

The thermal imaging assembly provided footage of subtle reformer tube temperature changes over time under different furnace operating conditions. The tube temperature information was combined with other plant process operation variable information to deduce the reaction conditions in the reformer tubes that otherwise would not be measurable.

We claim:

1. An apparatus for thermal imaging of an interior space of a high temperature furnace through an opening in a wall of the high temperature furnace, the apparatus comprising:
   a camera comprising an optical sensor;
   a rigid borescope comprising an elongated housing having a viewing end and a sensor end, and a multi-element relay lens assembly within the elongated housing having at least two optical pieces for directing a real image viewed by the rigid borescope to the camera, the viewing end comprising a lens, the sensor end of the rigid borescope operatively connected to the camera;
   an outer housing having a sensor end portion and a viewing end portion and defining an interior space within the outer housing, the interior space containing at least portion of the rigid borescope, the outer housing and the at least a portion of the rigid borescope defining a passage therebetween, the sensor end portion of the outer housing corresponding to the sensor end of the rigid borescope, the viewing end portion of the outer housing corresponding to the viewing end of the borescope, the viewing end portion defining a hole in fluid communication with the passage, the hole cooperatively arranged to permit the real image to pass to the viewing end of the rigid borescope, the outer housing having a port operatively disposed between the sensor end portion and the viewing end portion, the port in fluid communication with the passage, wherein the camera is operatively disposed outside the passage and outside the port;
   a partitioning member operatively disposed to obstruct fluid communication between the passage and the camera;
   a refractory block, the refractory block defining a cavity therethrough, wherein at least a portion of the viewing end portion of the outer housing is disposed within the cavity of the refractory block, the refractory block cooperatively arranged to permit the real image to pass to the viewing end of the rigid borescope; and
   a viewport door plate, wherein the outer housing is attached to the viewport door plate, wherein the outer housing passes through the viewport door plate, wherein the viewport door plate is disposed between the port and the viewing end portion of the outer housing, and wherein the refractory block is attached to the viewport door plate.

2. The apparatus of claim 1 wherein the lens is made of a material selected from the group consisting of sapphire, quartz, and calcium fluoride.

3. The apparatus of claim 1 wherein the partitioning member is disposed inside the outer housing.

4. The apparatus of claim 1 further comprising:
   a container operatively connected to the sensor end portion of the outer housing, wherein the container contains the camera; and
   a battery operatively connected to the camera to provide power to the camera, wherein the container contains the battery.

5. The apparatus of claim 4 further comprising a solar panel operatively connected to the battery, the solar panel disposed outside the container.

6. The apparatus of claim 4 further comprising a controller operatively connected to the camera, wherein the container contains the controller.

7. The apparatus of claim 4 further comprising a wireless transmitter operatively connected to the camera to transmit images from the camera to a computer, wherein the container contains the wireless transmitter.

8. The apparatus of claim 4 further comprising memory storage operatively connected to the camera to store images taken by the camera, wherein the memory storage is contained in the container.

9. The apparatus of claim 4 wherein the partitioning member is disposed inside the container.

10. The apparatus of claim 4 further comprising a connector, the connector connecting the container to the outer housing.

11. The apparatus of the claim 10 wherein the partitioning member is disposed in the connector.

12. The apparatus of claim 1 wherein the elongated housing of the rigid borescope is tapered at the viewing end and terminates at the lens.

13. The apparatus of claim 1 wherein the camera and the rigid borescope are removable from the outer housing as a subassembly;
   wherein the subassembly is installable in a second outer housing, the second outer housing having a sensor end portion and a viewing end portion and defining an interior space within the second outer housing,
   wherein when the subassembly is installed in the second outer housing, the interior space of the second outer housing contains at least a portion of the rigid borescope, the second outer housing and the at least a portion of the rigid borescope define a passage therebetween, the sensor end portion of the second outer housing corresponds to the sensor end of the rigid borescope, the viewing end portion of the second outer housing corresponds to the viewing end of the borescope, the viewing end portion of the second outer housing defines a hole in fluid communication with the passage in the second outer housing wherein the hole is cooperatively arranged to permit the real image to pass to the viewing end of the borescope, the second outer housing has a port operatively disposed between the sensor end portion and the viewing end portion of the second outer housing wherein the port of the second outer housing is in fluid communication with the passage in the second outer housing, and the camera is operatively disposed outside the passage of the second outer housing and outside the port of the second outer housing; and
   wherein the second outer housing is attached to a second viewport door plate, wherein the second outer housing passes through the second viewport door plate, wherein the second viewport door plate is disposed between the port of the second outer housing and the viewing end portion of the second outer housing, and wherein a second refractory block is attached to the second viewport door plate, wherein the second refractory block defines a cavity therethrough, wherein at least a portion of the viewing end portion of the second outer housing is disposed within the cavity of the second refractory block wherein the second refractory block is cooperatively arranged to permit the real image to pass to the viewing end of the rigid borescope.

14. The apparatus of claim 13 wherein the subassembly further comprises:

a container operatively connected to the sensor end portion of the outer housing, wherein the container contains the camera;
a battery operatively connected to the camera to provide power to the camera, wherein the container contains the battery;
a solar panel operatively connected to the battery, the solar panel disposed outside the container;
a wireless transmitter operatively connected to the camera to transmit images from the camera to a computer, wherein the container contains the wireless transmitter; and
a controller operatively connected to the camera, wherein the container contains the controller.

15. The apparatus of claim 1 further comprising:
a flow regulator operatively disposed to regulate flow of a fluid through the port of the outer housing.

16. The apparatus of claim 15 further comprising:
a temperature sensor configured to acquire a measured value relatable to a temperature of the viewing end of the rigid borescope and for generating an electronic signal in response thereto; and at least one of
  (i) a meter with display operatively connected to the temperature sensor to receive the electronic signal and display a temperature value responsive to the electronic signal; and
  (ii) an electronic controller operatively connected to the temperature sensor and the flow regulator and configured to control the flow regulator to regulate the flow of the fluid through the port in response to the electronic signal from the temperature sensor.

17. A method for obtaining thermal images in a high temperature furnace over an extended period of time, the method comprising:
installing an assembly for thermal imaging on the high temperature furnace, the assembly for thermal imaging comprising
  a camera comprising an optical sensor;
  a rigid borescope comprising an elongated housing having a viewing end and a sensor end, and a multi-element relay lens assembly within the elongated housing having at least two optical pieces for directing a real image viewed by the rigid borescope to the camera, the viewing end comprising a lens, the sensor end of the borescope operatively connected to the camera;
  an outer housing having a sensor end portion and a viewing end portion and defining an interior space within the outer housing, the interior space containing at least a portion of the rigid borescope, the outer housing and the at least a portion of the rigid borescope defining a passage therebetween, the sensor end portion of the outer housing corresponding to the sensor end of the rigid borescope, the viewing end portion of the outer housing corresponding to the viewing end of the rigid borescope, the viewing end portion defining a hole in fluid communication with the passage, the hole cooperatively arranged to permit the real image to pass to the viewing end of the borescope, the outer housing having a port operatively disposed between the sensor end portion and the viewing end portion, the port in fluid communication with the passage, wherein the camera is operatively disposed outside the passage and outside the port;
aspirating air from outside the outer housing into the port in the outer housing, passing the air from the port through the passage and over an external surface of the elongated housing of the rigid borescope, passing the air from the passage over the lens and out the hole in the viewing end portion of the outer housing and into the high temperature furnace wherein the air does not pass over the camera when being passed from the port to the high temperature furnace; and
measuring temperature information by:
  directing a plurality of real images viewed by the rigid borescope to the camera;
  capturing a plurality of images corresponding to the plurality of real images wherein each image of the plurality of images comprises pixel data; and
  processing the pixel data to obtain the temperature information for each of the plurality of images.

18. The method of claim 17 further comprising:
acquiring a measured value relatable to a temperature of the viewing end of the rigid borescope; and
adjusting a flow rate of air through the passage responsive to the measured value relatable to the temperature of the viewing end of the rigid borescope.

19. The method of claim 17 wherein ambient air is aspirated into the port, wherein the ambient air is air in an unenclosed space proximate to and outside the furnace and proximate to and outside the outer housing, the ambient air having a pressure; and
wherein the furnace is operated, at least in the vicinity of the viewing end portion of the outer housing, at a pressure that is less than the pressure of the ambient air outside the furnace and the outer housing.

* * * * *